United States Patent [19]

Bordewick

[11] 3,996,645
[45] Dec. 14, 1976

[54] FISH SKINNING DEVICE

[76] Inventor: Gerald K. Bordewick, 523 W. 6th St. Apt. 3, Antioch, Calif. 94509

[22] Filed: Oct. 9, 1974

[21] Appl. No.: 513,304

[52] U.S. Cl. .................................................. 17/66
[51] Int. Cl.² ........................................ A22C 25/17
[58] Field of Search ............... 17/62, 64, 66, 68, 69, 17/70, 21, 50

[56] References Cited

UNITED STATES PATENTS

| 2,039,850 | 5/1936 | Silaj | 17/68 |
| 2,148,944 | 2/1939 | Helm | 17/66 |
| 2,178,019 | 10/1939 | Knuteson | 17/66 |
| 2,785,436 | 3/1957 | Noland et al. | 17/68 |
| 3,771,197 | 11/1973 | Heuer | 17/68 |
| 3,820,196 | 6/1974 | Penman | 17/66 |

OTHER PUBLICATIONS

Popular Mechanics, Oct., 1939, p. 610 (copy available in Group 330).

Primary Examiner—Robert Peshock
Assistant Examiner—James D. Hamilton

[57] ABSTRACT

A hand-held fish skinning device is disclosed having a tee-head at one end of a handle body adapted to be held in the user's hand. The end of the tee-head remote from the handle body is formed as a sharp beak which can be readily pressed through the skin of the fish. The neck or shank joining the tee-head to the handle body is provided with a sharp edge so contoured that after the beak is pressed through the skin of the fish the tee-head can be pressed forward under the skin of the fish, making a continuous cut through the skin of the fish and thus the skin of the fish can be cut into panels, while yet on the body of the fish, by successive cuts made with the blade on the neck or shank of the tee-head. The nearer end of the tee-head (nearer the handle body) is formed as a gripping jaw for use in gripping the skin of the fish. A second, movable gripping jaw is provided which when forced toward the nearer end of the tee-head by means of a lever adapted to be squeezed into the handle body by the user cooperates with the nearer end of the tee-head to grip the skin of the fish for removal from the body of the fish by tearing it therefrom.

3 Claims, 9 Drawing Figures

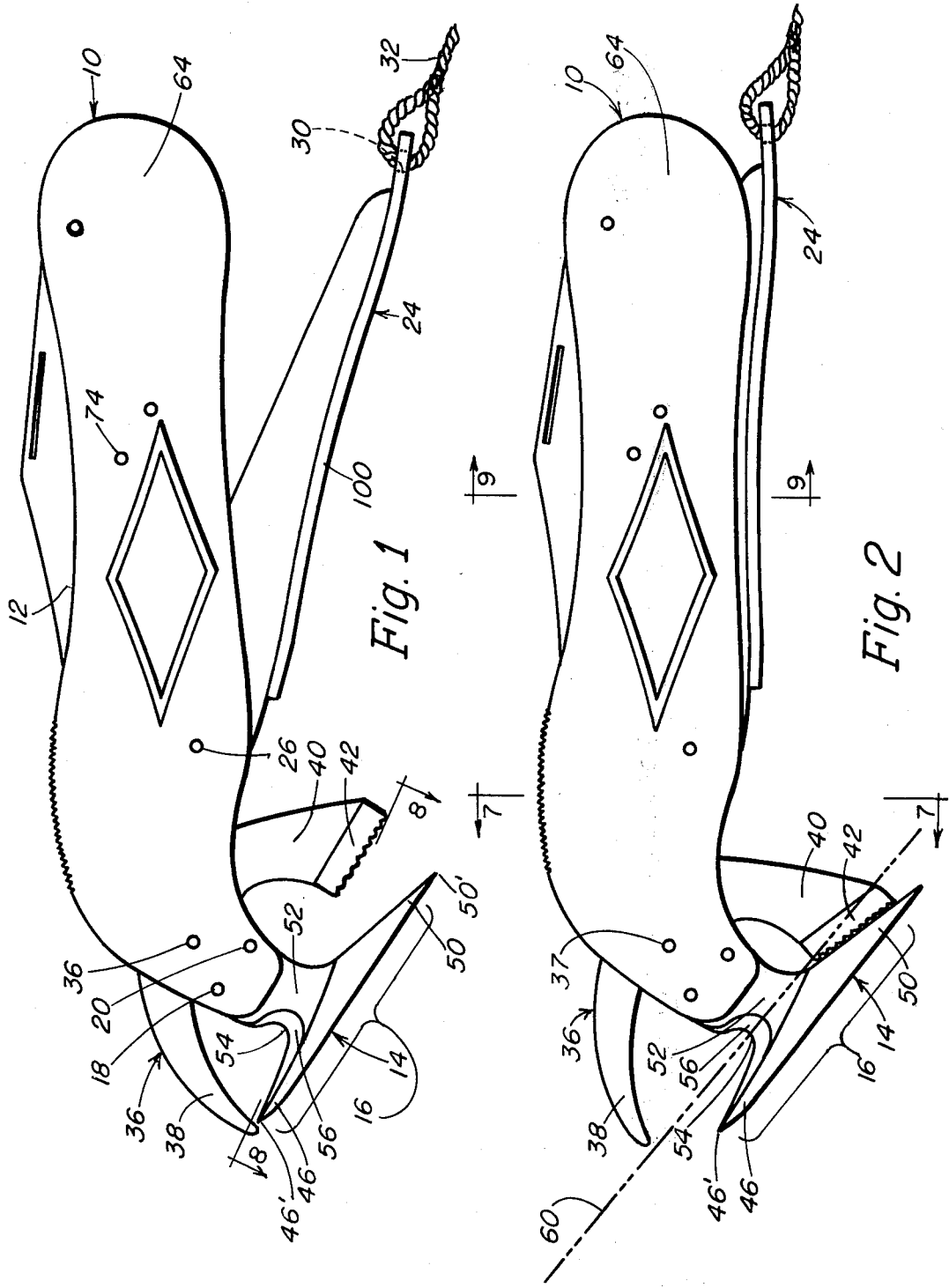

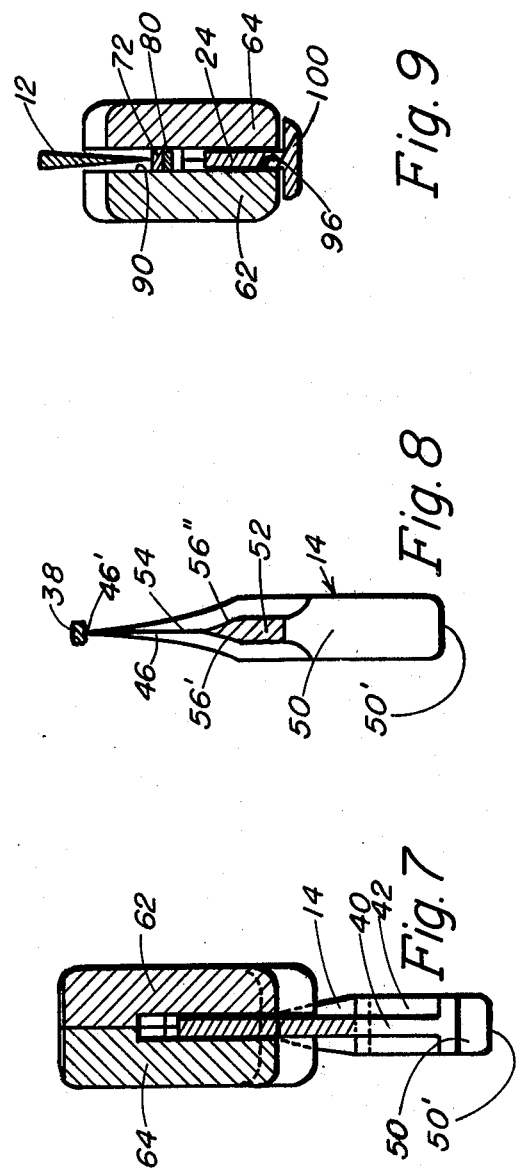

FISH SKINNING DEVICE

BACKGROUND OF THE INVENTION

1. Field of the Invention

The present invention relates to fish skinning devices, and more particularly to improved hand-held fish skinning devices incorporating both means for cutting the skin of a fish into separate panels and means for firmly gripping said panels for easier removal by tearing from the body of the fish.

2. Description of the Prior Art

The prior art includes numerous fish skinning devices of a kind far more elaborate than the device of the present invention. For instance, in at least one prior art fish skinning device a crank-operated roller is provided onto which the fish skin is wound in the provess of removing it from the body of the fish.

SUMMARY OF THE INVENTION

I have discovered, however, that many fishermen require a simple, hand-held fishing skinning device which provides means for cutting the fish skin into panels while still attached to the fish and gripping means for use in tearing the skin panels from the fish, all in one instrument.

I have also discovered that the skin of a fish can most easily be panelized by means of a type of cutter which I call a push-knife, that is, a cutter having a prow or beak which can be pressed through the skin of the fish, and above the prow or beak a curved knife-edge formed as a recess for receiving the fish skin as the prow or beak is thrust forward under the skin of the fish, the prow or beak being mounted at an oblique angle to a handle and the curved knife-edge being located between the beak and the handle.

I have also discovered that when using a cutter of the kind just described, having a prow or beak and a knife-edged recess of the kind just described, fish skinning can be most efficiently and expeditiously carried out if gripping means including jaws opening in the opposite direction from the direction in which the prow or beak is thrust under the skin of the fish.

Therefore, it is an object of my invention to provide hand-held fish skinning means by which the skin of the fish may be panelized by thrusting a pointed prow or beak under the skin of the fish and then pushing the beak forward under the skin of the fish and along the side of the fish, the skin of the fish being cut by means of a knife-edged recess adjacent the beak.

It is a further object of my invention to provide, in a fish skinning device having such a beak and adjacent knife-edged recess, gripping jaws for gripping the skin of the fish, said jaws being located near the beak and opening in a direction opposite to the direction in which the beak points.

Other objects of my invention will in part be obvious, and will in part appear hereinafter.

My invention, accordingly, comprises the features of construction, combinations of elements, and arrangements of parts which are exemplified in the constructions hereinafter set forth, and the scope of my invention will be indicated in the appended claims.

For a full understanding of the nature and objects of my invention, reference should be had to the following detailed description, taken in conjunction with the accompanying drawings.

BRIEF DESCRIPTION OF THE DRAWINGS

FIG. 1 is a plan view of the preferred embodiment of the present invention as it would be seen lying upon a workbench or other horizontal surface in its unoperated state;

FIG. 2 is a plan view of the preferred embodiment of the present invention as it would be seen lying upon a workbench or other horizontal surface, but in its operated state;

FIG. 5 is a view in elevation of the device of the preferred embodiment as it appears when lying upon a workbench or other horizontal surface, taken from above in FIG. 3;

FIG. 6 is a view in elevation of the preferred embodiment of the present invention as it appears when lying upon a workbench or other horizontal surface, taken from below in FIG. 4;

FIG. 7 is a transverse sectional view showing certain details of the preferred embodiment, the plane of the section being indicated by the line 7—7 of FIG. 2;

FIG. 8 is a tranverse sectional view of the device of the preferred embodiment, the plane of the section being indicated by the line 8—8 of FIG. 1; and FIG. 9 is a transverse sectional view of the preferred embodiment of the present invention, the plane of the section being taken on line 9—9 of FIG. 2.

DESCRIPTION OF THE PREFERRED EMBODIMENT

Figure 3:
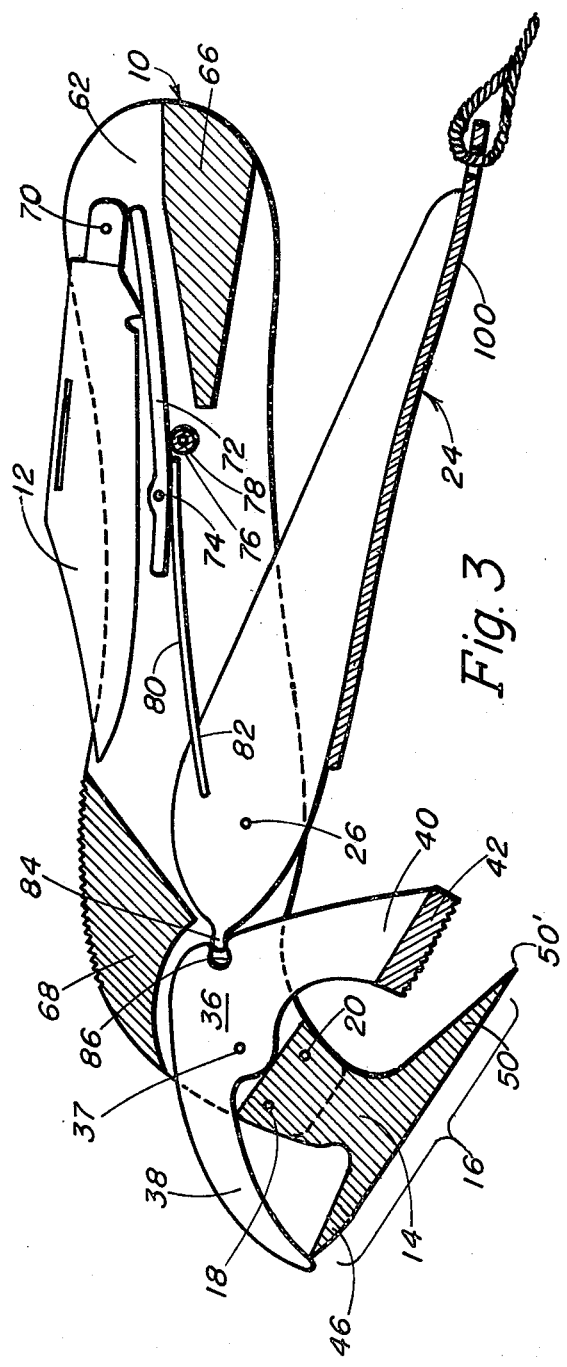
FIG. 3 is a plan sectional view of the preferred embodiment of the present invention, showing in detail the working parts and their cooperation in the unoperated state of the preferred embodiment.

Reference is now had to FIG. 1, which shows the device of the preferred embodiment of the present invention as it appears when unused and lying upon a workbench or other horizontal surface.

As may be seen in FIG. 1, the device of the present invention comprises a main handle and body portion 10 within which a jack-knife blade 12 is disposed in the well-known manner. It is to be understood, however, that the present invention is not limited to devices comprising such jack-knife blades.

As may further be seen in FIG. 1, a tee-head 14 comprising a working head 16 is affixed to one end of body 10, as by means of rivets 18 and 20. The device of the preferred embodiment as shown in FIG. 1 further comprises an operating handle 24 which is pivotably mounted on a rivet 26. As also seen in FIG. 1, a hole 30 may be provided in the outer end of handle 24 for receiving a lanyard 32 whereby loss of the device may be prevented, as, for instance, by securing the outer end of lanyard 32 around the wrist of the user.

The device of the preferred embodiment further comprises a rocker member 36 which is pivotably mounted on rivet 37. The outer end of rocker member 36 (i.e., the leftmost end as seen in FIG. 1) takes the form of a safety jaw 38, which will be described hereinafter. The inner end 40 of rocker member 36 (rightmost in FIG. 1), sometimes called the "gripping jaw", carries a serrated pad or plate 42 the function of which will be explained hereinafter.

As further seen in FIG. 1, safety jaw 38 contacts or lies close to the outer end 46 of working head 16 when operating handle 24 is in its unoperated position, i.e., its position most remote from main body 10. As also shown in FIG. 1, the serrated pad 42 of gripping jaw 40 is most remote from the inner end 50 of working head 16 when operating handle 24 is in its unoperated position.

Going now to FIG. 2, and comparing it with FIG. 1, it will be seen that rocker member 36 is rocked about rivet 16 when the device of the invention is squeezed in the hand of the user, and thus operating handle 24 is pressed into main body 10. As will further be seen by comparison of FIGS. 1 and 2, the pressing of operating handle 24 into main body 10, and the consequent rocking of rocker member 36, causes safety jaw 38 to be withdrawn from close proximity to the outer end or beak 46 working head 16. As may also be seen by comparison of FIGS. 1 and 2, the pressing of handle 24 into body 10, and the consequent rocking of rocker 36 brings the serrated pad 42 of gripping jaw 40 (sometimes called the inner gripping jaw) into contact with the inner end 50 of working head 16. The inner end 50 of working head 16 is sometimes called the outer gripping jaw.

In accordance with a principal feature of the present invention the shank or neck portion 52 of tee-head 14 is provided with an indenture 54. A knife-edge or cutting edge 56 extends substantially around the periphery of indenture 54, and also may extend along the inner edge of beak 46 to the point 46' or close to the joint 46'. As may be seen by comparison of FIGS. 1 and 8, point 46' of beak 46 is a sharp point, such as will easily penetrate the toughest of fish skins.

OPERATION

Before describing its inner structural details, the manner of using the device of the preferred embodiment will be described.

In removing the skin of a fish by the use of the device of the present invention, the skin of the fish is first divided into sections by incisions made with cutting edge 56, and then these skin sections are ripped off the body of the fish with the aid of gripping jaws 40 and 50 acting together.

In making the above-described incisions, the user firmly grasps the device in his closed hand, and thus presses handle 24 fully inwardly, withdrawing safety jaw 38 from beak 46 as shown in FIG. 2. Grasping the fish firmly in his other hand, by the tail for instance, the user forces the point 46' of beak 46 into the skin of the fish, until the skin of the fish (60 in FIG. 2) is in contact with the cutting edge 56. After thus locating the beak 46 of the device of the invention in the body of the fish the user, maintaining his grasp on the fish tail and on the device, forces the device forward, toward the head of the fish, while maintaining beak 46 at approximately the same depth in the body of the fish. When beak 46 has thus been forced to the head of the fish, the first incision is completed, and the device is then lifted out of the incision.

Assuming said first incision to have been made along the dorsal area of the fish body, a second incision may then be made along the ventral area of the fish body, substantially from tail to head, using the device of the invention in the aforedescribed manner.

After making the two longitudinal incisions as just described, additional incisions may be made between these two incisions, the incisions together outlining panels of fish skin which are to be removed with the aid of the gripping jaws 40 and 50 of the device of the invention.

In accordance with one mode of employing the device of the invention, said panels may be removed before the tail is removed from the fish. In carrying out this mode the fish is grasped by the tail, with the fish head nearer the user than the tail, and the sharp space end 50' of outer gripping jaw 50 is thrust under the caudal end of one of the aforesaid panels, the device then being in the operating state illustrated in FIG. 1 because operating lever 24 is released by the usuer. user. is to be noted that at this stage of the skinning operation, when the sharp point 46' is necessarily located close to the hand of the user which is grasping the tail of the fish, safety jaw 38 covers point 46' (see FIG. 1), thus preventing possible accidental injury to the user.) After the outer gripping jaw 50 is thus thrust beneath the caudal end of the skin panel, the user squeezes the device in his closed hand, thus pressing handle 24 into the main body 10, and firmly gripping the skin panel between the gripping jaws 40 and 50. When the skin panel is thus firmly gripped by the gripping jaws, and the fish tail is firmly grasped in the user's other hand, the skin panel may be torn from the fish. The remaining skin panels may then be removed from the fish using the device of the invention in the same maner, whereafter the fish head and tail may be removed in the usual manner using folding blade 12 if desired.

Going to FIGS. 3 ad 4, the inernal structural details of the device of the preferred embodiment will now be described.

As will be understood by comparison of these Figures with FIGS. 1 and 2, main body 10 is comprised of a back cover member 62 and a front cover member 64, which are maintained in spaced apart relation by means of spacing members 66 and 68, said cover members and said spacing members being joined together by suitable means (not shown). As best seen in FIGS. 3 and 4, tee-head 14 is affixed between said cover members by means of a pair of fasteners 18 and 20, e.g., rivets. As may also be seen in FIGS. 3 and 4, the aforedescribed folding jack-knive blade 12 is pivotably mounted on rivet 70. A cantilever leaf spring 72 is provided for the purpose of maintaining jack-knife blade 12 in either of its positions, i.e., the retracted position shown in FIGS. 1 through 4 and the operative position in which blade 12 extends substantially rightwardly as the device is seen in these figures. As seen in FIG. 3, cantilever leaf spring 72 is mounted upon a rivet 74, which extends from cover member 62 to cover member 64. In addition, cantilever spring 72 bears against a cylindrical sleeve 76. which is itself mounted upon a rivet 78 (FIG. 3).

Figure 4:
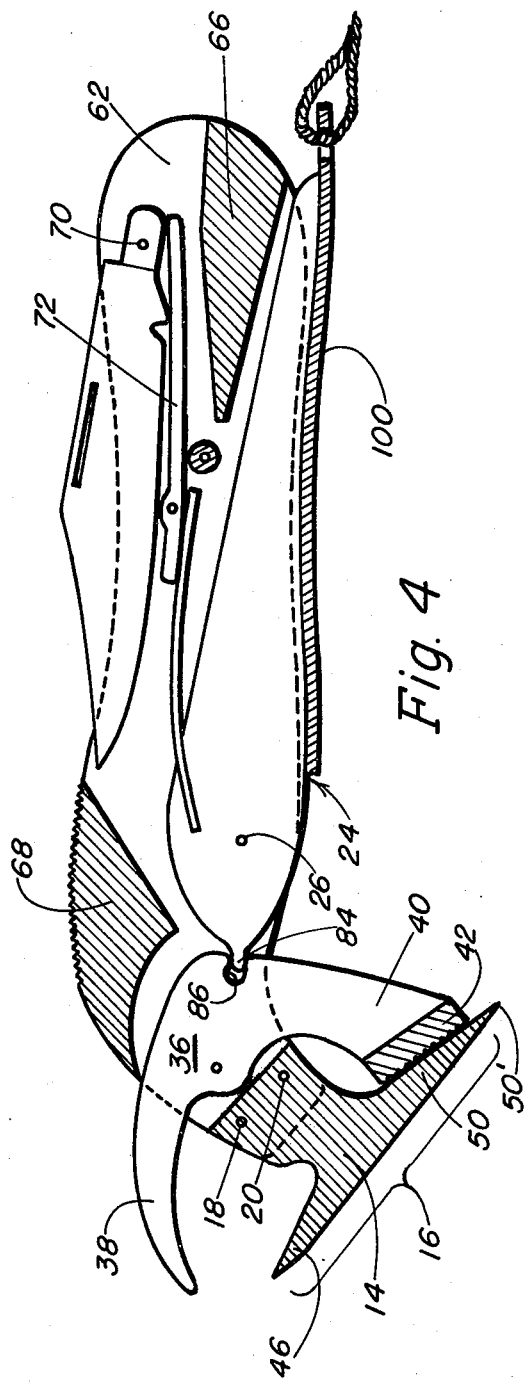
FIG. 4 is a plan sectional view of the preferred embodiment of the present invention, showing in detail the internal parts and their cooperation in the operated state of the preferred embodiment.

As further seen in FIG. 3, an additional cantilever leaf spring 80 is provided for normally resiliently maintaining operating handle 24 in its unoperated position (FIGS. 1 and 3). The left-hand end of leaf spring 80 as seen in FIG. 3 is tight-fittingly received in a slot 82 cut in lever 24. The right-hand end of leaf spring 80 bears against the lower surface of leaf spring 72 closely adjacent rivet 74. As further seen in FIG. 3, a tongue 84 projecting from the inner end of operating handle 24 closely interfits with a recess 86 in rocker 36. The cooperation of tongue 84 and recess 86, as illustrated in FIGS. 3 and 4 taken together, brings about the conjoint action of rocker 36 and operating handle 24 as described hereinabove. Further, the cooperation of tongue 84 and recess 86 also serves to limit the movement of operating handle 24 out of main body 10 to the extreme position shown in FIG. 3. Also, as shown in FIG. 4, the cooperation between tongue 84 and recess 86 results in the gripping engagement between pad 42 of inner gripping jaw 40 and the inner face of outer gripping jaw 50 which is required for the stripping of the fish skin panels described hereinabove.

Referring now to FIG. 5, it will be seen that folding knife blade 12 is received in a recess 90 defined by cover members 62 and 64, which are held in spaced relation by spacing members or bosses 66 and 67. As will also be seen in FIG. 5, cover members 62 and 64 are provided, respectively, with serrated areas 92 and 94 which are juxtaposed when the device of the preferred embodiment is assembled as to present a single serrated area adapted to be engaged by the thumb of the user, whereby to prevent slipping of the device of the preferred embodiment in the hand of the user. In addition, it may be seen in FIG. 5 that safety jaw 38 directly overlies tee-head 14, whereby to prevent injury to the user by point 46' of beak 46 when the sharp space end 50' of outer gripping jaw 50 is being thrust under a panel of the skin of a fish being cleaned, as hereinabove described.

Referring now to FIG. 6, it will be seen that operating handle 24 is received in a recess 96 defined by cover members 62 and 64, said cover members being spaced by spacing members or bosses 66, 67, 68, and 69, all as explained hereinabove. The cooperation between safety jaw 38 and beak 46 of tee-head 14 is also illustrated in FIG. 6. Comparing FIGS., 1 and 6, it may be seen that beak 46' of tee-head 14 is tapered inward, in both the horizontal and the vertical sense, to point 46'; while the inner end 50 of tee-head 14 is reduced only in the vertical sense (i.e., as shown in FIG. 1), whereby a flat blade 50' (sometimes called herein the space end), resembling an adze blade in miniature, is formed. It will further be seen in FIG. 6 that the transverse handle plate 100 of operating handle 24 in the preferred embodiment is mounted so as to be symmetrical about the central place of handle 24 hwereby to prevent cocking and binding of operating handle 24 when operating handle 24 is squeezed by the user in the use of the device of the invention.

Going now to FIG. 7, there is shown the relative positions of gripping haws 40 and 50, and pad 42 and spade edge 50', when operating handle 24 is pressed into recess 96 (FIGS. 2 and 4).

The configuration of the tee-head 14 of the preferred embodiment is particularly shown in FIG. 8. As there shown, the periphery of indenture 54 (FIGS. 1 and 2) is the line of intersection of surfaces 56' and 56'', constituting the curved knife edge 56 (FIGS. 1 and 2). As also seen in FIG. 8, when compared with FIG. 1, the sharp spade edge 50' of the inner end 50 of tee-head 14 (sometimes called the outer gripping jaw 50 herein) extends substantially from side to side of the inner end 50 of tee-head 14.

Referring now to FIG. 9, there is shown the juxtaposition of operating handle 24 and folding knife blade 12 when folding knife blade 12 is folded into recess 90, and operating handle 24 is forced into recess 96 by the user (i.e., the operating condition of the device of the preferred embodiment is illustrated in FIG. 2).

It will thus be seen that the objects set forth above, among those made apparent from the preceding description, are efficiently attained, and, since certain changes may be made in the above constructions without departing from the scope of the invention, it is intended that all matter contained in the above description or shown in the accompanying drawings shall be interpreted as illustrative, and not in a limiting sense.

It is particularly noted that although the invention has been disclosed as incorporating a safety jaw 38, safety jaw 38 may be eliminated without departing from the scope of the invention. Furthermore, while a folding knife blade 12 is conveniently incorporated in the preferred embodiment, it is to be understood that knife blade 12 may be eliminated without departing from the scope of the present invention.

It is also to be understood that the following claims are intended to cover all of the generic and specific features of the invention herein described, and all statements of the scope of the invention which, as a matter of language, might be said to fall therebetween.

What is claimed is:
1. A fish skinning device, comprising:
   an elongated handle adapted to be grasped in one hand;
   a working head comprising a shank joined to said handle and a sharp beak lying in a common plane with said handle and projecting from the end of said shank remote from said handle in a direction oblique to said handle;
   a continuous, concave knife edge commencing at said beak and extending along the edge of said beak adjacent said handle and around an indentation in said shank;
   a first jaw projecting from said end of said shank remote from said handle and away from said beak in said common plane;
   a second jaw movably mounted on said handle to coact with said first jaw to grasp the skin of a fish; and
   a jaw operating lever pivotably mounted on said handle for forcibly moving said second jaw into contact with said first jaw.

2. A fish skinning device as claimed in claim 1 in which a substantial part of said jaw operating lever is received in a recess in said handle when said second jaw is in contact with said first jaw.

3. A fish skinning device as claimed in claim 1, further comprising a safety jaw integral with said second jaw, said safety jaw extending from said handle to a point near the end of said beak when said first and second jaws are located at their maximum distance from each other, and being withdrawn from the point of said beak when said first and second jaws are in contact.

* * * * *